United States Patent
Lachance

(10) Patent No.: US 9,591,932 B2
(45) Date of Patent: Mar. 14, 2017

(54) BRACKET AND WALL STANDARD ASSEMBLY

(71) Applicant: 8157120 CANADA INC, Boucherville, Québec (CA)

(72) Inventor: Andre Lachance, Boucherville (CA)

(73) Assignee: 8157120 CANADA INC., Boucherville (CA)

(*) Notice: Subject to any disclaimer, the term of this patent is extended or adjusted under 35 U.S.C. 154(b) by 0 days.

(21) Appl. No.: 14/400,433

(22) PCT Filed: May 13, 2013

(86) PCT No.: PCT/CA2013/050365
§ 371 (c)(1),
(2) Date: Nov. 11, 2014

(87) PCT Pub. No.: WO2013/166610
PCT Pub. Date: Nov. 14, 2013

(65) Prior Publication Data
US 2015/0136924 A1   May 21, 2015

(51) Int. Cl.
*A47B 96/00* (2006.01)
*A47F 5/08* (2006.01)
(Continued)

(52) U.S. Cl.
CPC .......... *A47F 5/0876* (2013.01); *A47B 57/425* (2013.01); *A47B 97/001* (2013.01); *F16M 13/022* (2013.01)

(58) Field of Classification Search
CPC ..... A47B 57/425; A47B 57/48; A47B 57/482; A47B 97/001; A47B 57/40; A47B 57/404;
(Continued)

(56) References Cited

U.S. PATENT DOCUMENTS 3,511,193 A   5/1970   Schild
3,572,626 A   3/1971   Bertschi
(Continued)

FOREIGN PATENT DOCUMENTS

GB   1025357 A   4/1966

*Primary Examiner* — Christopher E Garft
(74) *Attorney, Agent, or Firm* — Norton Rose Fulbright Canada LLP

(57) ABSTRACT

A bracket and standard assembly comprises a standard having a plurality of spaced apart holes. A bracket comprises a support body having an elongated portion extending along a longitudinal axis. A connector end comprises at least one hook projecting rearwardly from the support body and passing through a hole in the standard to releasably hook the bracket to the standard, the at least one hook comprising a downwardly projecting tooth, the at least one hook defining with the support body a receptacle, a portion of the receptacle being delimited by a forwardly oriented contact edge of the tooth, the receptacle receiving one of wall portions of the standard. A finger projects generally upwardly from the at least one hook and having a forwardly oriented contact edge, the forwardly oriented contact edge of the finger being rearward of the forwardly oriented contact edge of the corresponding tooth along the longitudinal axis.

6 Claims, 8 Drawing Sheets

(51) Int. Cl.
*A47B 57/42* (2006.01)
*F16M 13/02* (2006.01)
*A47B 97/00* (2006.01)

(58) Field of Classification Search
CPC ..... A47B 57/406; A47B 57/56; A47F 5/0815;
A47F 5/0876; A47F 5/101; F16M 13/022
USPC ....................................... 248/220.31, 220.43
See application file for complete search history.

(56) References Cited

U.S. PATENT DOCUMENTS

| | | | |
|---|---|---|---|
| 4,307,671 A * | 12/1981 | Albano | A47B 57/045 |
| | | | 108/108 |
| 4,620,489 A | 11/1986 | Albano | |
| 5,613,449 A | 3/1997 | Pullman | |
| 6,182,937 B1 * | 2/2001 | Sanderse | A47B 96/061 |
| | | | 211/106.01 |
| 6,487,978 B1 * | 12/2002 | Hamberg | A47B 57/42 |
| | | | 108/106 |
| 6,641,098 B1 | 11/2003 | Proffitt | |
| 8,348,210 B1 * | 1/2013 | Lee | A47F 5/103 |
| | | | 248/220.31 |

\* cited by examiner

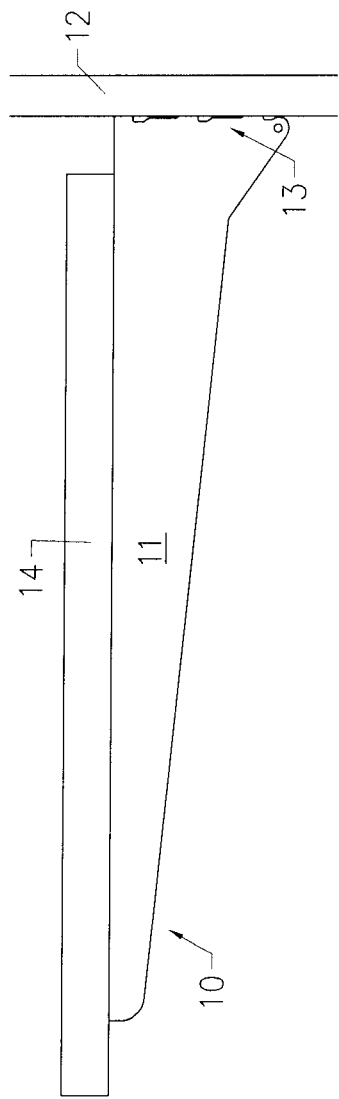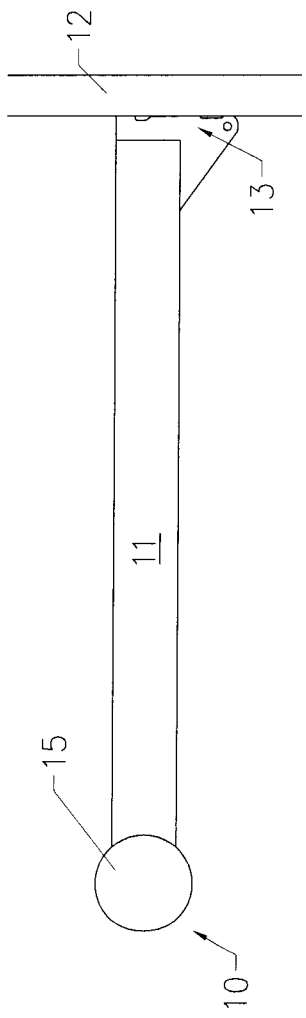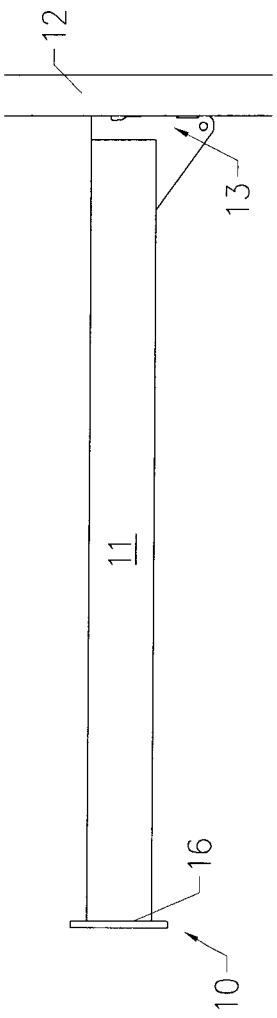

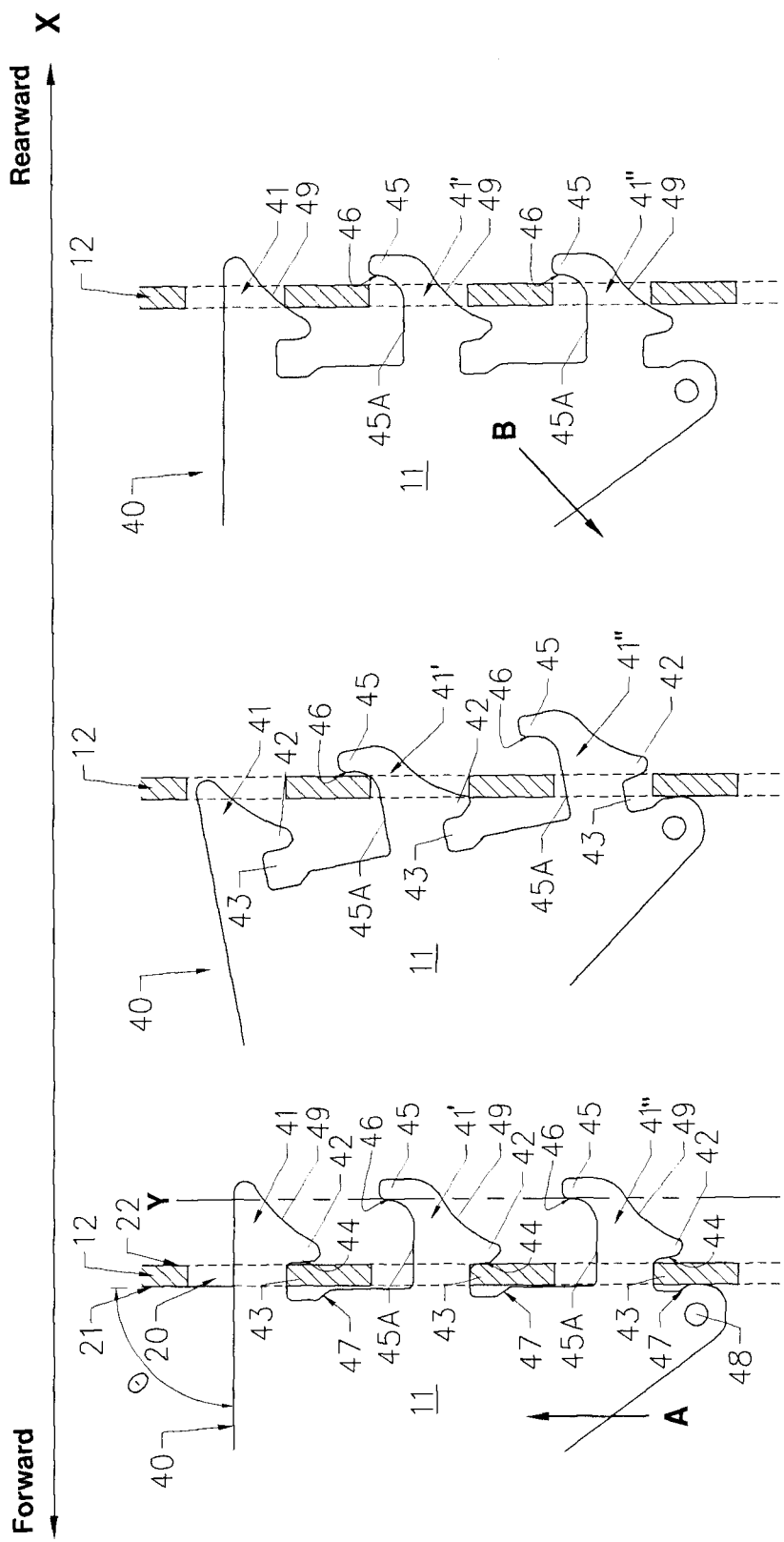

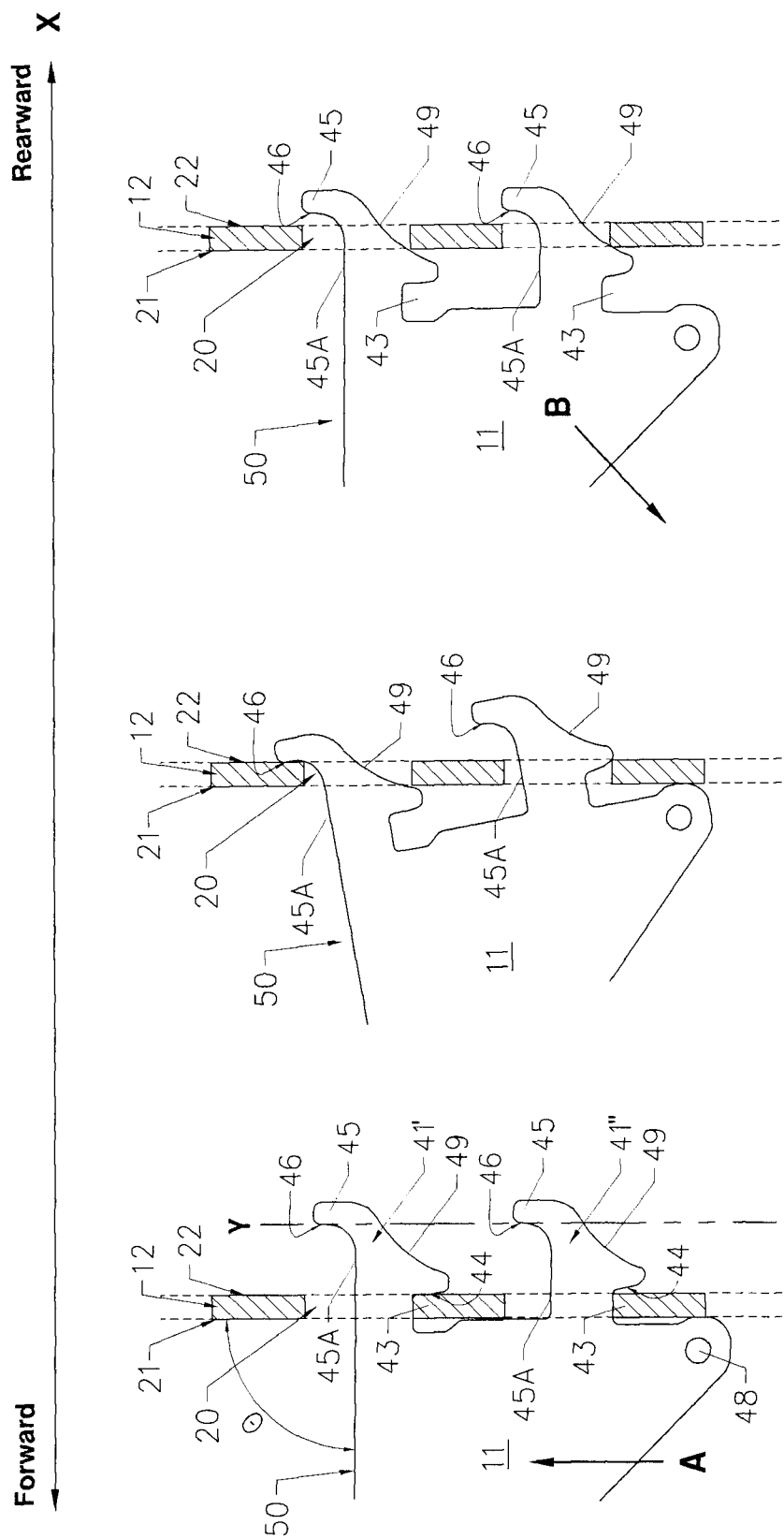

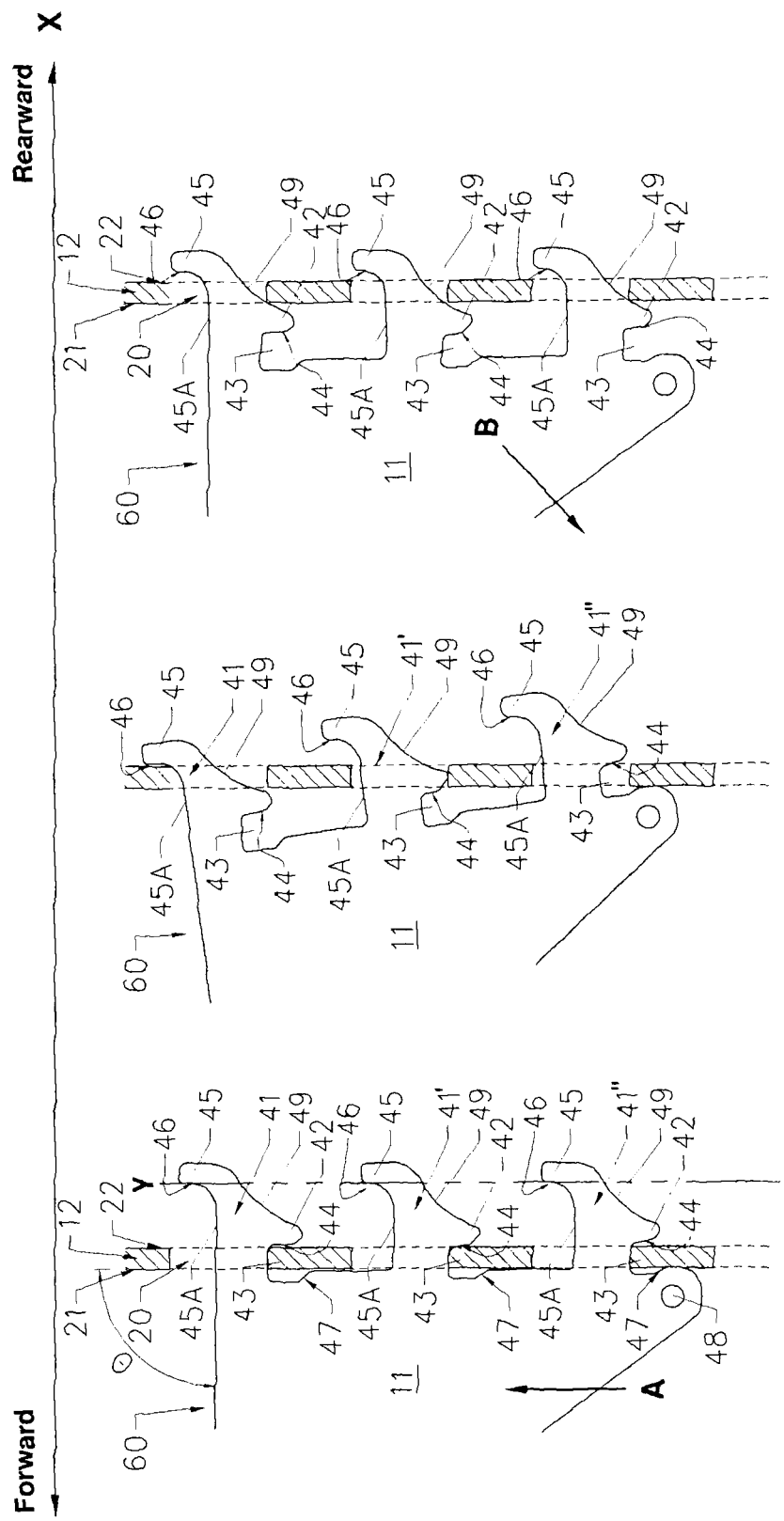

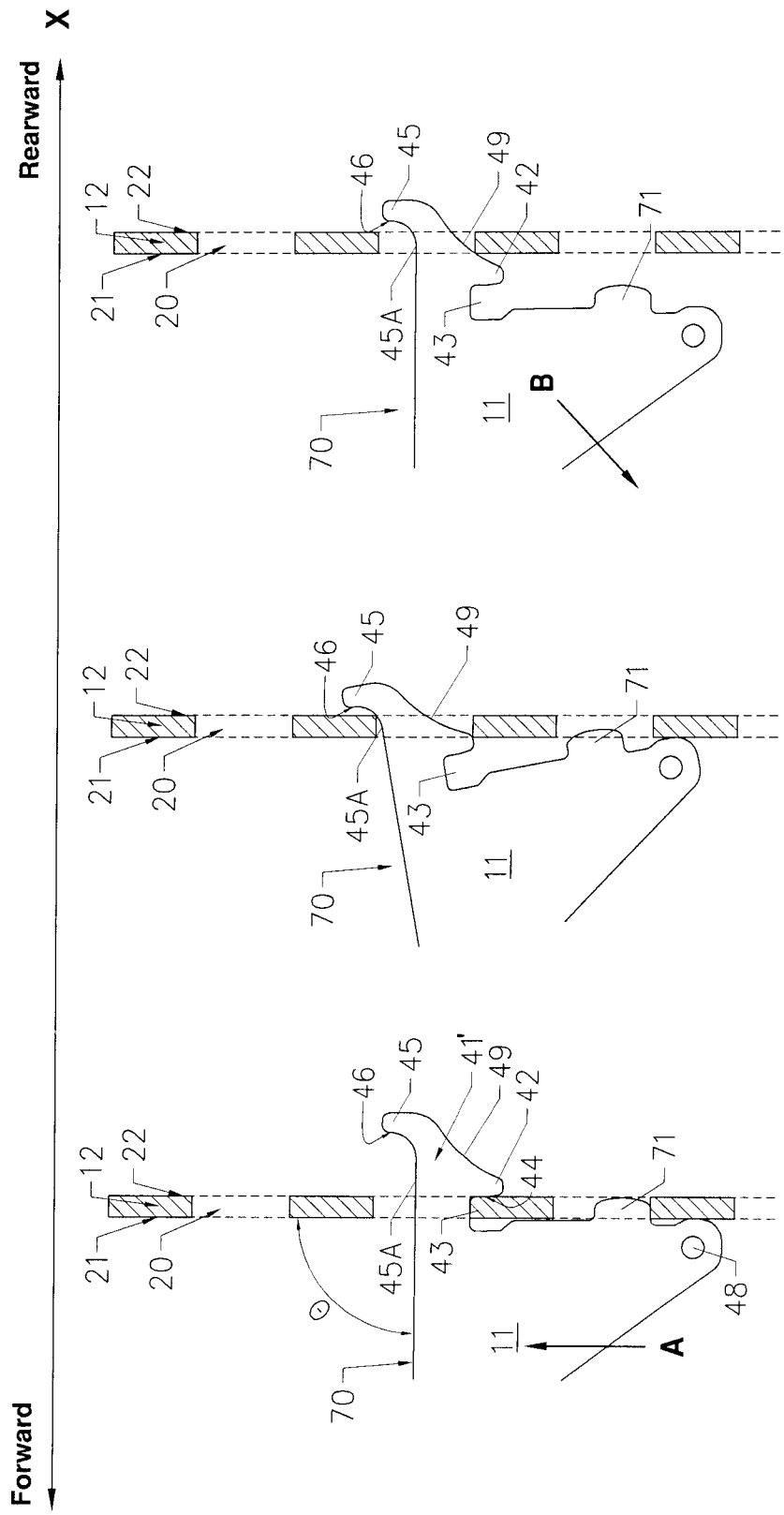

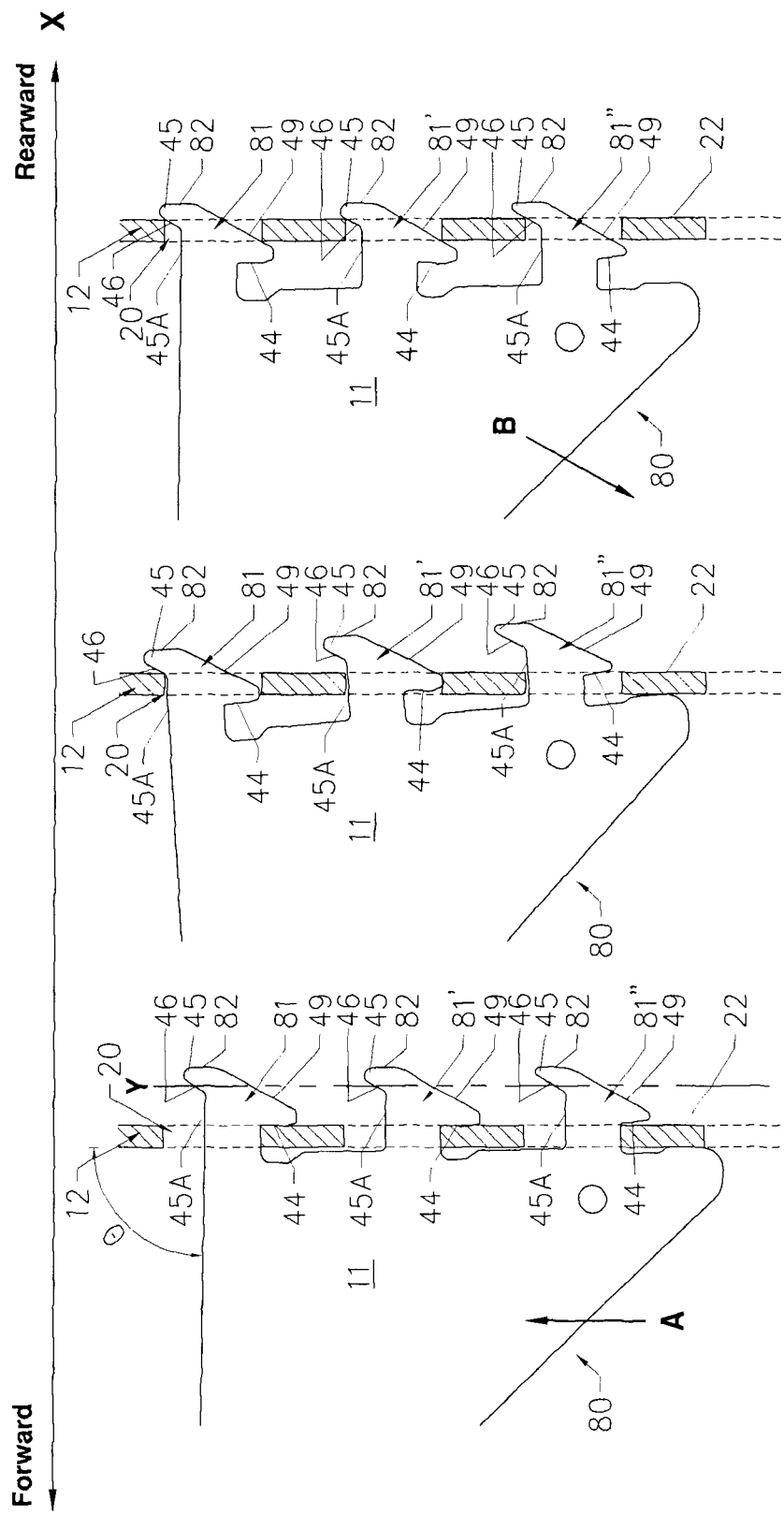

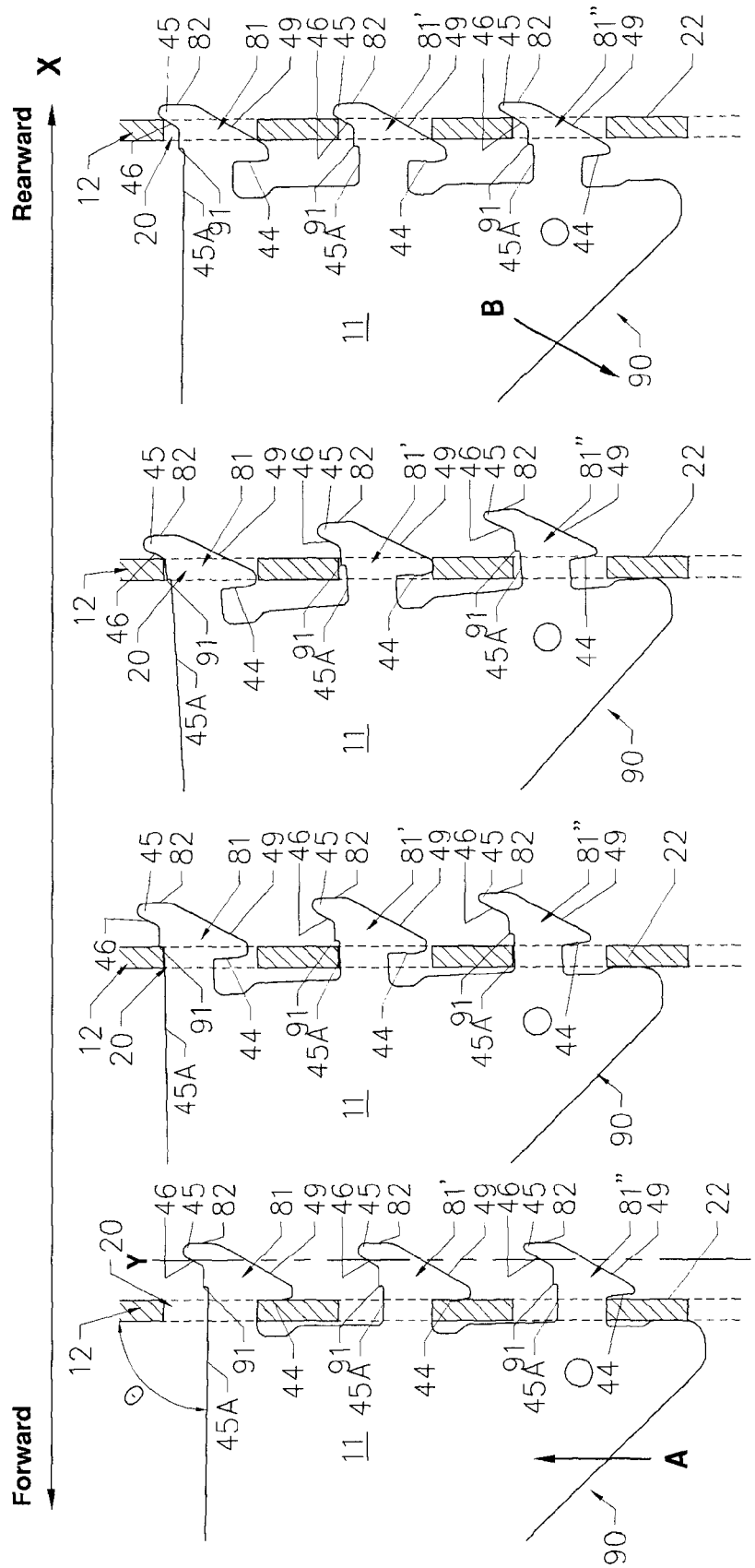

BRACKET AND WALL STANDARD ASSEMBLY

CROSS-REFERENCE TO RELATED APPLICATION

The present application claims priority on Canadian Patent Application No. 2,776,394, filed on May 11, 2012.

FIELD OF THE APPLICATION

The present application relates to brackets releasably secured to wall-mounted standards (also known as wall standards, racks, etc.), and used to supports shelves, or having a hangbar, or a faceout, for supporting hangers or other items in storage applications, such as in stores.

BACKGROUND OF THE ART

Sets of brackets and standards, also known as wall standards, racks, etc., are commonly used in storage and in display applications. For example, these sets may be used to support shelves. The brackets may alternatively have other configurations (e.g., hangbar, faceout) to support hangers with items thereon. The sets of brackets and standards are known to be practical, for instance in the retail sale stores, as the brackets are readily separated from the standards, whereby rack set-ups can be modified, for instance in accordance with a change of products being offered.

FIGS. 1A to 1C of the prior art show a variety of such brackets 10, each having an elongated body 11 for supporting items. The brackets 10 are releasably hung to standards 12 by hooks 13 at a rear end of the elongated body 11. FIG. 1A illustrates a shelf 14 being mounted to a bracket 10—the shelf 14 is typically supported by at least a pair of the brackets 10 spaced apart from one another and located at opposed ends of the shelf 14. In FIG. 1B, the bracket 10 has a hangbar 15. The hangbar 15 is a rod that is transversally positioned relative to the elongated body 11. Items are hung directly onto the hangbar 15, or onto hangers that are hung to the hangbar 15. In FIG. 1C, the bracket 10 has a faceout configuration, with a flange 16 at the end of the elongated body 11. The elongated body 11 therefore acts as support, for instance for hangers that will be hung onto the top edge of the elongated body 11.

Referring to FIGS. 5A and 5B of the prior art, a connector end configuration is shown, which connector end configuration may be used for any of the brackets 10 of FIGS. 1A to 1C. The connector end configuration is for use with the standard 12. The standard 12 is typically a slender plate or strip extending vertically, and having a plurality of holes 20. The holes 20 are equidistantly spaced apart from one another in the standard 12. The standard 12 may have a U-shaped section, an I-section, etc., and has a front surface 21 and a rear surface 22.

Still referring to FIGS. 5A and 5B of the prior art, the bracket 10 is shown having hooks 30, with an uppermost one of the hooks 30 being labeled 30'. The hooks 30/30' project from a rear edge of the elongated body 11 and each have a downwardly extending tooth 31. A receptacle 32 is defined by the body of the hook 30/30', the tooth 31, and a rear edge of the elongated body 11. As shown in FIG. 5A of the prior art, the hooks 30/30' are received in the holes 20 of the standard 12, with the receptacles 32 accommodating wall portions formed between the holes 20, and ensuring that the bracket 10 is anchored to the standard 12. The teeth 31 prevent the bracket 10 from being pulled out of the standard 12.

Still referring to FIGS. 5A and 5B of the prior art, the hook 30' has an upwardly-projecting finger 33. The finger 33 is provided to prevent an accidental dislodging of the bracket 10 in case of a upward impact on the elongated body 11. Indeed, the foremost vertical edge of the finger 33 is collinear with the foremost vertical edge of the tooth 31, whereby the bracket 10 must be rotated at a substantially large angle (e.g., 45°), as in FIG. 5B of the prior art, for the bracket 10 to be disengaged from the standard 12.

The pivoting of the bracket 10 to the angle of FIG. 5B of the prior art may be problematic for ergonomic reasons, or may complicate the installation of the bracket 10 when adjacent shelves are already installed above, etc. The required upper clearance may also be a constraint in terms of where the bracket 10 of the prior art may be installed. Moreover, when the brackets 10 are used to support a shelf, stock on the shelf must be removed prior to the pivoting removal of the bracket 10.

SUMMARY OF THE APPLICATION

It is therefore an aim of the present disclosure to provide a support bracket that addresses issues associated with the prior art.

Therefore, in accordance with the present application, there is provided a bracket of the type used with a standard comprising: a support body having an elongated portion extending along a longitudinal axis; a connector end comprising at least one hook projecting rearwardly from the support body and adapted to pass through a hole in the standard to hook the bracket to the standard, the at least one hook comprising a downwardly projecting tooth, the at least one hook defining with the support body a receptacle, a portion of the receptacle being delimited by a forwardly oriented contact edge of the tooth, the receptacle adapted to receive a wall portion of the standard; and a finger projecting generally upwardly from the at least one hook and having a forwardly oriented contact edge, the forwardly oriented contact edge of the finger being rearward of the forwardly oriented contact edge of the corresponding tooth along the longitudinal axis.

Further in accordance with the present disclosure, an abutment protrusion projects rearwardly from the support body and being spaced apart from the at least one hook, the abutment protrusion being adapted to abut against a periphery of a hole in the standard.

Still further in accordance with the present disclosure, two of the at least one hook are provided, with at least one of the two hooks each having one said finger.

Still further in accordance with the present disclosure, each of the two hooks comprises one said fingers.

Still further in accordance with the present disclosure, the forwardly oriented contact edge of one of the fingers upward is collinear with the forwardly oriented contact edge of the other of the fingers, relative to the longitudinal axis.

Still further in accordance with the present disclosure, three of the at least one hook are provided, with at least one of the three hooks each having one said finger.

Still further in accordance with the present disclosure, each of the three hooks comprises one of said fingers.

Still further in accordance with the present disclosure, the forwardly oriented contact edge of one of the fingers is collinear with the forwardly oriented contact edge of the other fingers, relative to the longitudinal axis.

Still further in accordance with the present disclosure, the forwardly oriented contact edge of the tooth has at least one of a substantially vertical segment portion and a tapering segment portion.

Still further in accordance with the present disclosure, the forwardly oriented contact edge of the finger has at least one of a substantially straight segment portion that is in a diagonal relation with a top horizontal surface of the at least one hook.

Still further in accordance with the present disclosure, a rear edge of the at least one hook in the tooth is straight and is in a diagonal relation with the top horizontal surface of the at least one hook.

Still further in accordance with the present disclosure, the forwardly oriented contact edge of the finger is parallel to the rear edge of the at least one hook.

Still further in accordance with the present disclosure, an abutment projects upwardly in the top horizontal surface of the at least one hook, the abutment being located forwardly of the finger, and rearwardly of the forwardly oriented contact edge of the tooth.

Still further in accordance with the present disclosure, the support body, the connector end and the finger are made from a monolithic plate.

Still further in accordance with the present disclosure, the forwardly oriented contact edge of the finger has a generally vertical portion.

Still further in accordance with the present disclosure, an arcuate transition portion is provided between the generally vertical portion of the finger and a top edge of the corresponding hook.

Still further in accordance with the present disclosure, the rearward contact edge of the at least one hook is adapted to engage in sliding movement with a periphery of a hole in the standard.

In accordance with another embodiment of the present disclosure, there is provided a bracket and standard assembly comprising: a standard having a plurality of spaced apart holes separated by wall portions; a bracket comprising: a support body having an elongated portion extending along a longitudinal axis; a connector end comprising at least one hook projecting rearwardly from the support body and passing through a hole in the standard to releasably hook the bracket to the standard, the at least one hook comprising a downwardly projecting tooth, the at least one hook defining with the support body a receptacle, a portion of the receptacle being delimited by a forwardly oriented contact edge of the tooth, the receptacle receiving one of the wall portions of the standard; and a finger projecting generally upwardly from the at least one hook and having a forwardly oriented contact edge, the forwardly oriented contact edge of the finger being rearward of the forwardly oriented contact edge of the corresponding tooth along the longitudinal axis.

Still further in accordance with the present disclosure, an abutment protrusion projects rearwardly from the support body and being spaced apart from the at least one hook, the abutment protrusion abutting against a periphery of one of the holes in the standard.

Still further in accordance with the present disclosure, two of the at least one hook are provided, with at least one of the two hooks each having one said finger.

Still further in accordance with the present disclosure, each of the two hooks comprises one of said fingers.

Still further in accordance with the present disclosure, the forwardly oriented contact edge of one of the fingers is collinear with the forwardly oriented contact edge of the other of the fingers, relative to the longitudinal axis.

Still further in accordance with the present disclosure, three of the at least one hook are provided, with at least one of the three hooks each having one said finger.

Still further in accordance with the present disclosure, each of the three hooks comprises one of said fingers.

Still further in accordance with the present disclosure, the forwardly oriented contact edge of one of the fingers is collinear with the forwardly oriented contact edge of the other fingers, relative to the longitudinal axis.

Still further in accordance with the present disclosure, the forwardly oriented contact edge of the tooth has at least one of a substantially vertical segment portion and a tapering segment portion.

Still further in accordance with the present disclosure, the forwardly oriented contact edge of the finger has at least one of a substantially straight segment portion that is in a diagonal relation with a top horizontal surface of the at least one hook.

Still further in accordance with the present disclosure, a rear edge of the at least one hook in the tooth is straight and is in a diagonal relation with the top horizontal surface of the at least one hook.

Still further in accordance with the present disclosure, the forwardly oriented contact edge of the finger is parallel to the rear edge of the at least one hook.

Still further in accordance with the present disclosure, an abutment projects upwardly in the top horizontal surface of the at least one hook, the abutment being located forwardly of the finger, and rearwardly of the forwardly oriented contact edge of the tooth.

Still further in accordance with the present disclosure, the support body, the connector end and the finger are made from a monolithic plate.

Still further in accordance with the present disclosure, the forwardly oriented contact edge of the finger has a generally vertical portion.

Still further in accordance with the present disclosure, an arcuate transition portion is between the generally vertical portion of the finger and a top edge of the corresponding hook.

Still further in accordance with the present disclosure, the rearward contact edge of the at least one hook is in sliding movement with a periphery of a hole in the standard when the bracket is at least one of engaged and disengaged from the standard.

BRIEF DESCRIPTION OF THE DRAWINGS

FIG. 1A is a side view of a bracket and standard assembly in accordance with the prior art, supporting a shelf;

FIG. 1B is a side view of a bracket and standard assembly in accordance with the prior art, having a hangbar;

FIG. 1C is a side view of a bracket and standard assembly in accordance with the prior art, in a faceout configuration;

FIG. 2A is a side view of a 3-hook bracket in accordance with an embodiment of the present disclosure, engaged to the standard;

FIG. 2B is a side view of the 3-hook bracket of FIG. 2A, having two hooks disengaged from the standard and a finger of one of the hooks abutted against the standard;

FIG. 2C is a side view of the 3-hook bracket of FIG. 2A, having all hooks disengaged from the standard;

FIG. 3A is a side view of a 2-hook bracket in accordance with another embodiment of the present disclosure, engaged to the standard;

FIG. 3B is a side view of the 2-hook bracket of FIG. 2A, having one hook disengaged from the standard and a finger of one of the hooks abutted against the standard;

FIG. 3C is a side view of the 2-hook bracket of FIG. 2A, having both hooks disengaged from the standard;

FIG. 4A is a side view of a 3-hook bracket in accordance with another embodiment of the present disclosure, engaged to the standard;

FIG. 4B is a side view of the 3-hook bracket of FIG. 4A, having two hooks disengaged from the standard and a finger of one of the hooks abutted against the standard;

FIG. 4C is a side view of the 3-hook bracket of FIG. 4A, having all hooks disengaged from the standard;

FIG. 6A is a side view of a 1-hook bracket in accordance with another embodiment of the present disclosure, engaged to the standard;

FIG. 6B is a side view of the 1-hook bracket of FIG. 4A, having a finger of the hook abutted against the standard;

FIG. 6C is a side view of the 1-hook bracket of FIG. 4A, having its hook disengaged from the standard;

FIG. 7A is a side view of a 3-hook bracket in accordance with yet another embodiment of the present disclosure, engaged to the standard;

FIG. 7B is a side view of the 3-hook bracket of FIG. 7A, having two hooks disengaged from the standard and a finger of one of the hooks abutted against the standard;

FIG. 7C is a side view of the 3-hook bracket of FIG. 7A, having its hooks disengaged from the standard;

FIG. 8A is a side view of a 3-hook bracket in accordance with yet another embodiment of the present disclosure, engaged to the standard;

FIG. 8B is a side view of the 3-hook bracket of FIG. 8A, having an abutment on a top horizontal edge of one of the hooks abutted against the standard;

FIG. 8C is a side view of the 3-hook bracket of FIG. 8A, having two hooks disengaged from the standard and a finger of one of the hooks abutted against the standard; and FIG. 8D is a side view of the 3-hook bracket of FIG. 8A, having its hooks disengaged from the standard.

DESCRIPTION OF THE PREFERRED EMBODIMENTS

Figures 5A, 5B:
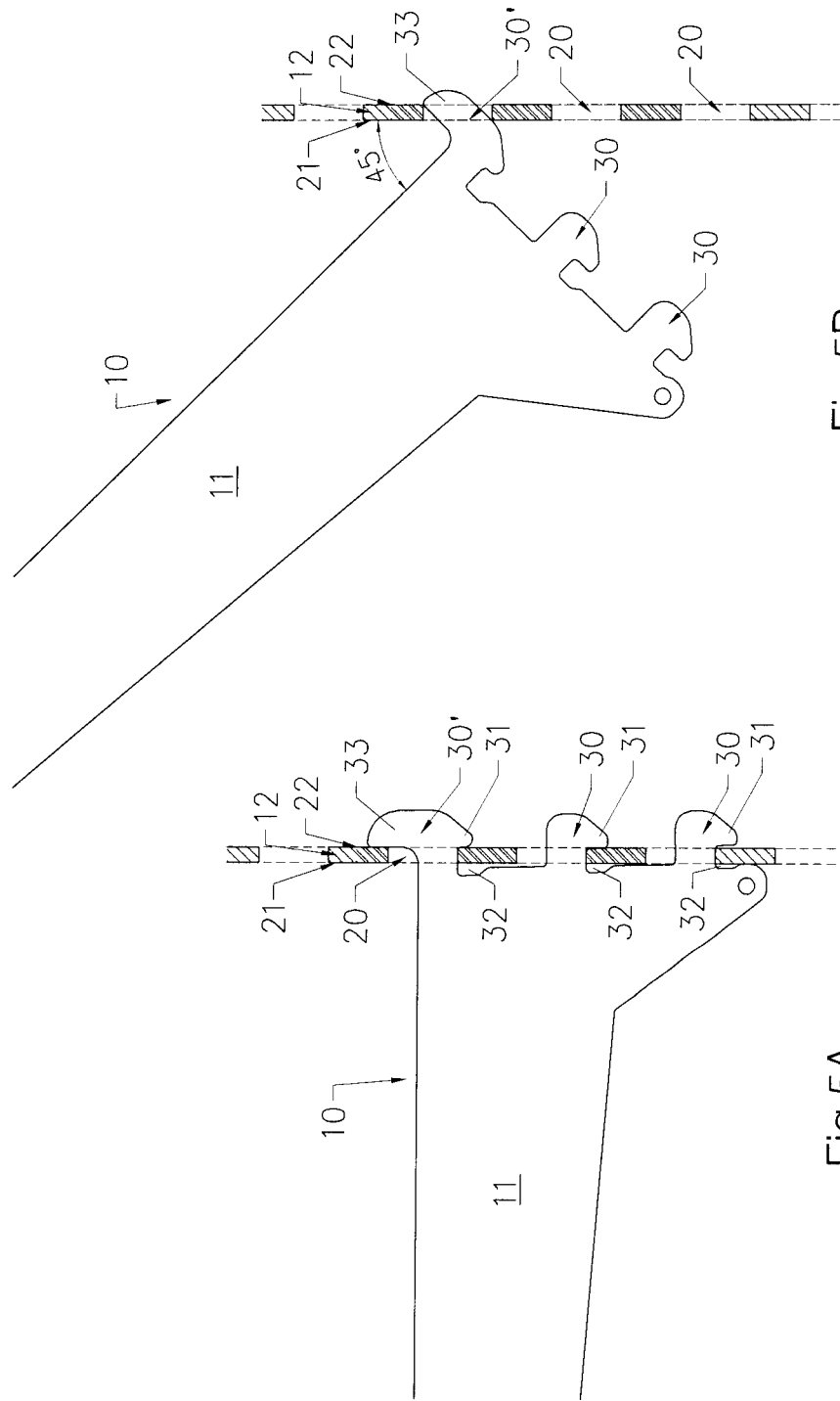
FIG. 5A is a side view of a bracket and standard assembly in accordance with the prior art, showing an interconnection between hooks and the standard.
FIG. 5B is a side view of a bracket and standard assembly of FIG. 5A, showing the pivoting motion required to release the bracket from engagement with the standard.

Referring to the drawings and more particularly to FIGS. 2A-2C, a support bracket in accordance with a first embodiment of the present disclosure is generally shown at 40. The bracket 40 and other brackets described hereinafter are similar in design to the bracket 10 of the prior art (FIGS. 1A-1C, 5A-5B), especially in terms of the components thereof that project forwardly of the standard 12 along axis X (i.e., the longitudinal axis of the bracket), which components can be generally referred to as being part of the elongated support body 11. Accordingly, only a portion of the elongated support body 11 is illustrated. The bracket 40 and other brackets described hereinafter may be configured to support a shelf, and hangbar, a faceout as in any of FIGS. 1A-1C.

The bracket 40 has three hook portions, namely 41, 41' and 41", projecting rearwardly from a rear edge of the elongated body 11. For clarity, reference to forward or rearward will be in relation to the longitudinal axis X of the bracket, with the forward end being away from the standard 12 (to the left-hand side of the page). Each of the hook portions 41 has a downwardly projecting tooth 42. The tooth 42 defines a receptacle 43 with a remainder of the hook portion 41 and with the support body 11. The receptacle 43 is delimited by a forwardly oriented contact edge 44 of the tooth 42. It is observed that the forwardly oriented contact edge 44 may have a generally vertical segment and/or a downwardly tapering segment, or a combination thereof.

Fingers 45 project generally upwardly from a generally straight top horizontal edge 45A of the hook portions 41' and 41", while the hook portion 41 does not have any such finger 45. Each of the fingers 45 has a forwardly oriented contact edge 46. The forwardly oriented contact edge 46 may be at a right angle relative to the top horizontal edge 45A of its corresponding hook portion 41' or 41". In the illustrated embodiment of FIGS. 2A-2C, there is an arcuate transition profile between the top horizontal edge of the hook portion 41'/41" and the forwardly oriented contact edge 46 of the fingers 45. However, any other appropriate transition profile is considered.

It is observed that the forwardly oriented contact edge 46 of both hook portions 41' and 41" is rearward of the contact edge 44 of the teeth 42, relative to the longitudinal axis X, as shown by vertical axis Y. Moreover, the forwardly oriented contact edge 44 of the hook portion 41" is shown as being collinear to the contact edge 44 of the hook portion 41', i.e., both along axis Y, although these edges 44 may be offset from one another as well.

The bracket 40 may also have clearances 47 in the support body 11, and in communication with the receptacle 43. The clearances 47 may reduce friction between the bracket 40 and the standard 12 at assembly and disassembly of the bracket 40 to the standard 12. A throughbore 48 may be provided in the support body 11, the throughbore 48 being used during manufacturing and/or shipping of the bracket 40, for instance to apply paint or coatings thereon, etc. The clearances 47 and the throughbores 48 may or may not be in the brackets described herein.

Now that the various components of the bracket 40 have been described, the sequence for disengaging the bracket 40 of FIGS. 2A to 2C from the standard 12 is set forth.

In FIG. 2A, the bracket 40 is shown in its support position, in which it is engaged to the standard 12, with the hook portions 41, 41' and 41" penetrated through the holes 20 of the standard 12, and with wall portions of the standard 12 being engaged in the receptacles 43 of each of the hook portions 41, 41' and 41". It is observed that the contact edge 44 of the teeth 42 may abut against the rear surface 22 of the standard 12, while a rear edge of the elongated body 11 abuts against the front surface 21 of the standard 12. In case of an upward vertical impact on the bracket 40, the fingers 45 prevent the accidental disengagement of the bracket 40 from the standard 12.

With the bracket 40 in the support position shown in FIG. 2A, vertical force A is manually applied to the bracket 40 to raise same and therefore disengage the hook portions 41, 41' and 41" from engagement with the wall portions of the standard 12. When the bracket 40 is partially separated from the standard 12 from being raised by vertical force A, it may be oriented to a generally horizontal orientation. A pulling force B is then applied to the bracket 40, as shown in FIG. 2C, to align the hook portion 41' with the periphery of the corresponding hole 20 in the standard 12. According to the dimension of the hook portions 41' and 41", the force B may be applied within a given range of directions, in translation and possibly with a rotational movement, with the bracket

40 remaining generally horizontal as a result of the force B. It is noted that the force B may be partially horizontal, and partially downward, i.e., at most a negligible upward motion if any. As a result of the pulling force B, the teeth 42 of both hook portions 41' and 41" first pass through the holes 20 as in FIG. 2C, and the fingers 45 then follow. The force B may be strictly horizontal, with the forwardly oriented contact edge 46 and transition portion leading to the edge 46 sliding against the standard 12 when the fingers 45 come out of the holes 20.

It is observed that tapering segments on the contact edge 44 may be used for sliding contact with the periphery of the holes 20, to guide the user in pulling the bracket 40 out of engagement with the standard 12. Moreover, the rear edge 49 of the hook portions 41, 41' and 41" may also be used in similar fashion, as in FIG. 2C, to push the bracket 40 in the standard 12.

Referring to FIG. 2B, the bracket 40 is shown as being held in captive engagement with the standard 12, despite an inadvertent upward impact on the bracket 40. It is shown that the tooth 42 and finger 45 of the hook portion 41' block into the standard 12, thereby preventing the accidental dislodgment of the bracket 40. The hook portion 41" could also get caught in the standard 12 in similar fashion to the hook portion 41', thereby providing a second level of protection from inadvertent dislodgment.

Referring to FIGS. 3A to 3C, a bracket in accordance with another embodiment of the present disclosure is illustrated at 50. The bracket 50 has numerous components also present in the bracket 40 of FIGS. 2A to 2C, whereby like elements will bear like reference numerals. One distinction between the brackets 40 and 50 is the absence of the hook portion 41. Hence, the bracket 50 is a 2-hook support bracket. The procedure to remove the bracket from the standard 12 is similar to the procedure set forth above for the bracket 40.

Referring to FIGS. 4A to 4C, a bracket in accordance with yet another embodiment of the present disclosure is illustrated at 60. The bracket 60 has numerous components also present in the bracket 40 of FIGS. 2A to 2C, whereby like elements will bear like reference numerals. One distinction between the brackets 40 and 60 is the presence of three fingers 45. Hence, the bracket 60 is a 3-hook support bracket, with three upwardly projecting fingers 45. The procedure to remove the bracket from the standard 12 is similar to the procedure set forth above for the bracket 40.

Referring to FIGS. 6A to 6C, a bracket in accordance with yet another embodiment of the present disclosure is illustrated at 70. The bracket 70 has numerous components also present in the bracket 40 of FIGS. 2A to 2C, whereby like elements will bear like reference numerals. One distinction between the brackets 40 and 70 is the absence of the hook portion 41 and 41". Hence, the bracket 70 is a 1-hook support bracket. The bracket 70 may have an abutment protrusion 71 in lieu of the hook portion 41 and 41", to provide additional contact between the bracket 70 and the standard 12, in the support position as in FIG. 6A. The procedure to remove the bracket from the standard 12 is similar to the procedure set forth above for the bracket 40.

Referring to FIGS. 7A to 7C, a bracket in accordance with yet another embodiment of the present disclosure is illustrated at 80. The bracket 80 has numerous components also present in the bracket 40 of FIGS. 2A to 2C, whereby like elements will bear like reference numerals. One distinction between the brackets 40 and 80 is the overall geometry of the hook portions, labeled as hook portions 81, 81' and 81". The bracket 80 is a S-hook support bracket, but the distinct geometry of the hook portions 81, 81' and 81" may be brackets with fewer hooks. The bracket 80 is of the type that is well suited to be used in installation wherein the depth is limited between the rear surface 22 of the standard 12 and a wall rearward of the standard 12, such as the wall to which the standard 12 is connected. In the bracket 80, the forwardly oriented contact edge 46 is shown as being straight and in a diagonal relation relative to the top horizontal edge 45A of its corresponding hook portion 81, 81' and 81". The rear edge 49 of the hook portions 81, 81' and 81" may also be straight and in such a diagonal relation with the top horizontal edge 45A of the hook portions 81, 81' and 81". In FIGS. 7A to 7C, the contact edge 46 and the rear edge 49 are shown as being parallel or quasi-parallel to one another. In such a geometry, the width between the contact edge 46 and the rear edge 49 is reduced compared to other embodiments, while providing sufficient structural integrity to hold the bracket 80 captive to the standard 12 as in FIG. 7B. In FIGS. 7A-7C, the rear edge 82 of the hook portion 81, 81' and 81" is shown as being straight, and transverse, or even perpendicular, to the top horizontal edge 45A, i.e. the rear edge 82 is generally vertical when the bracket 80 is assembled to the standard 12. The width between the contact edge 46 and the rear edge 49, and the angle between the top horizontal edge 45A and the rear edge 49 are determined as a function of the thickness of the standard 12, the dimensions of the holes 20, the desired value of angle $\theta$, and the required strength for the fingers 45.

The procedure to remove the bracket 80 from the standard 12 is similar to the procedure set forth above for the bracket 40. Additionally, the straightness of the forwardly oriented contact edge 46 may result in the bracket 80 being removable without having to rotate the bracket 80 relative to the standard 12. Hence, the combination of the straight forwardly oriented contact edge 46 and the straight and vertical rear edge 82 results in the bracket 80 being capable of being installed and removed when the space in the rear of the standard 12 is limited.

Referring to FIGS. 8A to 8D, a bracket in accordance with yet another embodiment of the present disclosure is illustrated at 90. The bracket 90 has numerous components also present in the bracket 40 of FIGS. 2A to 2C, whereby like elements will bear like reference numerals. Moreover, the bracket 90 is similar in overall geometry to the bracket 80, whereby the bracket 90 is shown as having the hook portions 81, 81' and 81". The bracket 90 is a 3-hook support bracket, but the distinct geometry of the hook portions 81, 81' and 81" may be brackets with fewer hooks. The bracket 90 distinguishes over the bracket 80 of FIGS. 7A-7C by the presence of an abutment 91 in the top horizontal edge 45A.

The abutment 91 is of relatively small height (e.g., 1-2 mm). The abutment 91 may come into abutment with rear surface 22 of the standard 12 in the manner shown in FIG. 8B, to further prevent disengagement of the bracket 90 in instances of accidental contact, and help in guiding the bracket 90 back to its hooked position. The abutment 91 is positioned along the top horizontal edge 45A, and is rearwardly positioned relative its associated contact edge 44. In other words, as shown in FIG. 8A, the contact edges 44 are in contact with the rear surface 22 of the standard 12, while the abutments 91 are clearly observed as being distanced from the rear surface 22. It is pointed out that the abutment 91 may be present in any of the brackets 40, 50, 60, 70 and 80.

The procedure to remove the bracket 90 from the standard 12 is similar to the procedure set forth above for the bracket 40.

The brackets 40, 50, 60, 70, 80 and 90 may consist in any appropriate material (metal, plastic, natural fibers, etc.) in accordance with the contemplated use. According to an embodiment, a major portion of these brackets consists of a flat metal plate that is stamped, molded, cast, cut to the shapes illustrated in the figures—other methods of manufacturing are also considered. Additional components such as a hangbar or faceout may be added to the connector end featuring the hook portions 41, 41' and 41", for instance by being welded or braised to the remainder of the bracket. The elongated support body 11 is typically monolithic or integral with the connector end. The brackets 40, 50, 60, 70, 80 and 90 may have any appropriate finish, with paint, coating, etc.

According to an embodiment, as shown in FIG. 2A, the angle θ between the top horizontal edge surface 45A of the support body 11 and the front surface 21 of the standard 12 may be 90° or slightly less than 90° when the bracket 40 (or brackets 50, 60, 70, 80 or 90) is assembled to the standard 12. Therefore, any item supported by the brackets will not tend to move forward by the effect of gravity, provided the standard 12 is suitably upright.

While the methods and systems described herein have been described and shown with reference to particular steps performed in a particular order, it will be understood that these steps may be combined, subdivided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A bracket of the type used with a standard comprising:
   a support body having an elongated portion extending along a longitudinal axis and a rear edge portion being substantially vertical;
   a connector end comprising at least one hook projecting in a rearward direction from the support body and adapted to pass through a hole in the standard to hook the bracket to the standard, the at least one hook comprising a tooth downwardly projecting from a hook portion that extends in the rearward direction from the support body, the tooth defining with the hook portion and the rear edge portion of the support body a receptacle, a portion of the receptacle being delimited by a forwardly oriented contact edge of the tooth, the receptacle adapted to receive a wall portion of the standard between the rear edge portion of the support body and the forwardly oriented contact edge of the tooth, and against the hook portion, the forwardly oriented contact edge of the tooth having at least a substantially vertical segment portion, a rear edge segment of the at least one hook in the tooth being straight and in a diagonal relation with a top horizontal edge of the at least one hook; and
   a finger projecting generally upwardly from the at least one hook and having a forwardly oriented contact edge, the forwardly oriented contact edge of the finger being in the rearward direction from the forwardly oriented contact edge of the corresponding tooth along the longitudinal axis, the forwardly oriented contact edge of the finger having at least a substantially straight segment portion that is in a diagonal relation with the top horizontal edge of the at least one hook, the rear edge segment of the at least one hook and the substantially straight segment portion being parallel to one another.

2. The bracket according to claim 1, comprising three of the at least one hook, with at least one of the three hooks having one of said finger.

3. The bracket according to claim 2, wherein each of the three hooks comprises one of said fingers.

4. The bracket according to claim 1, wherein the support body, the connector end and the finger are made from a monolithic plate.

5. The bracket according to claim 1, wherein a rearward contact edge of the at least one hook is adapted to engage in sliding movement with a periphery of a hole in the standard.

6. A bracket and standard assembly comprising:
   a standard having a plurality of spaced apart holes separated by wall portions;
   a bracket comprising:
      a support body having an elongated portion extending along a longitudinal axis;
      a connector end comprising at least one hook projecting in a rearward direction from the support body and passing through a hole in the standard to releasably hook the bracket to the standard, the at least one hook comprising a downwardly projecting tooth, the at least one hook defining with the support body a receptacle, a portion of the receptacle being delimited by a forwardly oriented contact edge of the tooth, the receptacle receiving one of the wall portions of the standard, the forwardly oriented contact edge of the tooth having at least a substantially vertical segment portion, a rear edge segment of the at least one hook in the tooth being straight and in a diagonal relation with a top horizontal edge of the at least one hook; and
      a finger projecting generally upwardly from the at least one hook and having a forwardly oriented contact edge, the forwardly oriented contact edge of the finger being in the rearward direction from the forwardly oriented contact edge of the corresponding tooth along the longitudinal axis, the forwardly oriented contact edge of the finger having at least a substantially straight segment portion that is in a diagonal relation with the top horizontal edge of the at least one hook, the rear edge segment of the at least one hook and the substantially straight segment portion being parallel to one another.

* * * * *